(12) United States Patent
Heavey

(10) Patent No.: US 11,580,538 B2
(45) Date of Patent: Feb. 14, 2023

(54) TRANSPARENT CROWD SOURCING FOR PROJECTS

(71) Applicant: MINUTEMAN CAPITAL LLC, Rocky River, OH (US)

(72) Inventor: Jonathan Heavey, Rocky River, OH (US)

(73) Assignee: MINUTEMAN CAPITAL LLC, Rocky River, OH (US)

( * ) Notice: Subject to any disclaimer, the term of this patent is extended or adjusted under 35 U.S.C. 154(b) by 626 days.

(21) Appl. No.: 16/186,203

(22) Filed: Nov. 9, 2018

(65) Prior Publication Data

US 2019/0139032 A1    May 9, 2019

Related U.S. Application Data

(60) Provisional application No. 62/662,978, filed on Apr. 26, 2018, provisional application No. 62/583,648, filed on Nov. 9, 2017.

(51) Int. Cl.

| | |
|---|---|
| *G06Q 20/38* | (2012.01) |
| *G06Q 20/36* | (2012.01) |
| *G06Q 40/04* | (2012.01) |
| *G06Q 20/40* | (2012.01) |
| *G06Q 40/06* | (2012.01) |
| *H04L 9/00* | (2022.01) |

(52) U.S. Cl.
CPC ..... *G06Q 20/3829* (2013.01); *G06Q 20/3678* (2013.01); *G06Q 20/401* (2013.01); *G06Q 20/405* (2013.01); *G06Q 40/04* (2013.01); *G06Q 40/06* (2013.01); *G06Q 2220/00* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 10,146,792 B1 * | 12/2018 | Dobrek | G06Q 20/0655 |
| 2007/0021853 A1 * | 1/2007 | Ma | G06Q 40/06 700/91 |
| 2012/0123928 A1 * | 5/2012 | Baggott | G06Q 40/04 705/37 |
| 2013/0017527 A1 * | 1/2013 | Nguyen | G06Q 30/0224 434/362 |

(Continued)

OTHER PUBLICATIONS

Dejan Radic, "Pay dividend in ether using token contract", Nov. 9, 2017 (Year: 2017).*

*Primary Examiner* — Jacob C. Coppola
(74) *Attorney, Agent, or Firm* — Tarolli, Sundheim, Covell & Tummino LLP

(57) ABSTRACT

Methods and systems are provided for crowdsourced funding via a blockchain system. A token contract, associated with a token issuer, is generated on a blockchain system. Tokens are issued to a plurality of token holders. Each of the plurality of token holders is allowed access to a feedback mechanism associated with the token issuer. A performance of the token issuer in an associated field is monitored to provide at least one performance metric. A dividend is paid to each token holder proportional to a number of tokens held by the token holder after a predetermined amount of time based on the at least one performance metric.

6 Claims, 3 Drawing Sheets

(56) References Cited

U.S. PATENT DOCUMENTS

| | | | | |
|---|---|---|---|---|
| 2014/0040157 A1* | 2/2014 | Cohen | ............... | G06Q 40/06 |
| | | | | 705/329 |
| 2014/0316598 A1* | 10/2014 | Yang | ............... | H02J 3/144 |
| | | | | 700/295 |
| 2016/0335629 A1* | 11/2016 | Scott | ............... | H04L 9/3268 |
| 2016/0358264 A1* | 12/2016 | Brightman | ............... | G06Q 40/06 |
| 2017/0213289 A1* | 7/2017 | Doney | ............... | G06Q 40/06 |
| 2019/0080407 A1* | 3/2019 | Molinari | ............... | G06Q 20/06 |
| 2019/0228406 A1* | 7/2019 | Patel | ............... | G06Q 20/3674 |
| 2020/0143367 A1* | 5/2020 | LeBeau | ............... | G06Q 20/3829 |
| 2020/0265518 A1* | 8/2020 | Spangenberg | ............... | H04L 9/3247 |
| 2022/0114670 A1* | 4/2022 | Rah | ............... | G06Q 20/02 |

* cited by examiner

TRANSPARENT CROWD SOURCING FOR PROJECTS

RELATED APPLICATIONS

This application claims priority to each of U.S. Provisional Patent Application Ser. No. 62/662,978, filed Apr. 26, 2018, and U.S. Provisional Patent Application Ser. No. 62/583,648, filed Nov. 9, 2017. Each of these applications is hereby incorporated by reference.

TECHNICAL FIELD

The present invention relates generally to computing systems, and more particularly to transparent crowdsourcing for projects using blockchain transactions.

BACKGROUND

A blockchain is an unbounded and cryptographically linked ordered list of blocks. Each block contains transaction data, a cryptographic hash of the previous block, and other metadata such as a transaction timestamp. A properly implemented blockchain uses a cryptographic hash that is both deterministic and also extremely difficult to reproduce without the exact contents of the previous block. In this manner, a blockchain is resistant to data modification since the precise contents in any block can be verified at any time against the cryptographic hash contained in the subsequent block.

A distributed blockchain is implemented on multiple instances executed on computers that may be geographically separate. In a typical implementation, each instance contains a copy of the blockchain. Instances communicate through a peer-to-peer network in order to maintain the integrity of the blockchain. A consensus scheme is established in advance to decide which version of the blockchain is authentic in case of any discrepancy. Such schemes are typically designed to favor the longest and/or most popular version of the blockchain. After such validation, the blockchain is considered authentic by all instances. In this manner, operations applied to one instance would be considered authentic if queried by any other instance as long as that operation is encoded on a validated copy of the blockchain.

A public distributed blockchain (PDB) is a distributed blockchain supported collaboratively by the general public. A PDB is executed on donated computer time and implements a blockchain whose data is publicly accessible. Although a central authority is needed to establish the rules under which the PDB operates, and perhaps provide the computer code needed to implement them, once launched, control of the PDB is passed to the community. Thus, a PDB provides decentralized, transparent, and verifiable consensus for any type of content that can be stored on a blockchain. Security of a PDB relies on collaborative participation. This is typically encouraged by some type of reward. For example, operators of a PDB instance might be rewarded with an amount of digital currency in proportion to the number of blocks they validate. A properly implemented PDB that enjoys sizable and world-wide participation is practically insusceptible, as a whole, to unauthorized manipulation by any one party.

A PDB virtual machine (PDBVM) is a computing environment encoded as transaction data on a PDB. Because a PDBVM is implemented on a blockchain, the execution of each computer instruction can be cryptographically verified. In addition, since a PDBVM is implemented on a PDB, instruction execution is secure, transparent, and decentralized. Unlike a traditional PDB, which needs to be rewritten and redeployed for each new application, a single PDBVM can support any number of independent applications that can be deployed at any date after the PDBVM is initiated. Each such application is written in computer code that can be introduced and executed on the computing environment represented in the transaction data of the blockchain provided by the PDBVM. In this sense, when properly implemented, the PDBVM is a general purpose computing platform that is decentralized, transparent, and verifiable.

In order to perform their functions, each application on a PDBVM responds to messages that originate outside the PDBVM, for example from a human user. Each message is encoded with an address that corresponds to the unique identity of the source of the message. A passphrase combined with a cryptographic signature ensures that the address cannot be forged, so long as the passphrase is secure. Thus, an application implemented on a PDBVM can use the address of the messages it receives to verify the identity of its users.

A token is a voucher implemented in a PDB that represents something of value, such as goods or services or future revenue. A specific class of token is typically implemented in an associated PDB application as a ledger that assigns a numerical quantity to individual addresses. The rules for how such tokens are created, disposed of, assigned, and traded are embedded in the implementation of the associated PDB application, and as such, are transparent and verifiable.

SUMMARY OF THE INVENTION

In one example, a system includes a blockchain system implementing a token contract, including an associated ledger, for funding an associated project. A contract maintenance system maintains stored user information for the token contract. A project feedback mechanism retrieves the ledger from a node of the blockchain system and allows token holders to communicate with an issuer of the token contract based on the contents of the blockchain ledger.

In another example, a method is provided. A token contract, associated with a token issuer, is generated on a blockchain system. Tokens are issued to a plurality of token holders. A performance of the token issuer in an associated field is monitored to provide at least one performance metric. A dividend is paid to each token holder proportional to a number of tokens held by the token holder after a predetermined amount of time based on the at least one performance metric.

In a further example, a method is provided. A token contract, associated with a token issuer, is generated on a blockchain system. Tokens are issued to a plurality of token holders. Each of the plurality of token holders is allowed access to a feedback mechanism associated with the token issuer. A performance of the token issuer in an associated field is monitored to provide at least one performance metric. A dividend is paid to each token holder proportional to a number of tokens held by the token holder after a predetermined amount of time based on the at least one performance metric.

DETAILED DESCRIPTION

The systems and method provided herein leverage the power of the blockchain to provide a fundraising mechanism for projects, such as political campaigns that is decentralized, transparent, and compliant with applicable regulations. To enforce compliance, the systems and methods provided herein provide tools to collect relevant information on token holders, such as name and country of residence for individuals. When relevant, for example, in political fundraising, complete and validated registration information will be required as necessary before any token transaction (e.g., token sale or trade) is settled. In the systems and methods provided herein, the registration information can be utilized, in combination with the blockchain ledger, to allow token holders access to a feedback component. The feedback component provides a structured mechanism for provided feedback to a project manager. As a result, along with any currency value of a token, the token allows the token holder preferential access to a project creator, allowing the token holder the opportunity to provide input as to a direction of the project.

Figure 1:
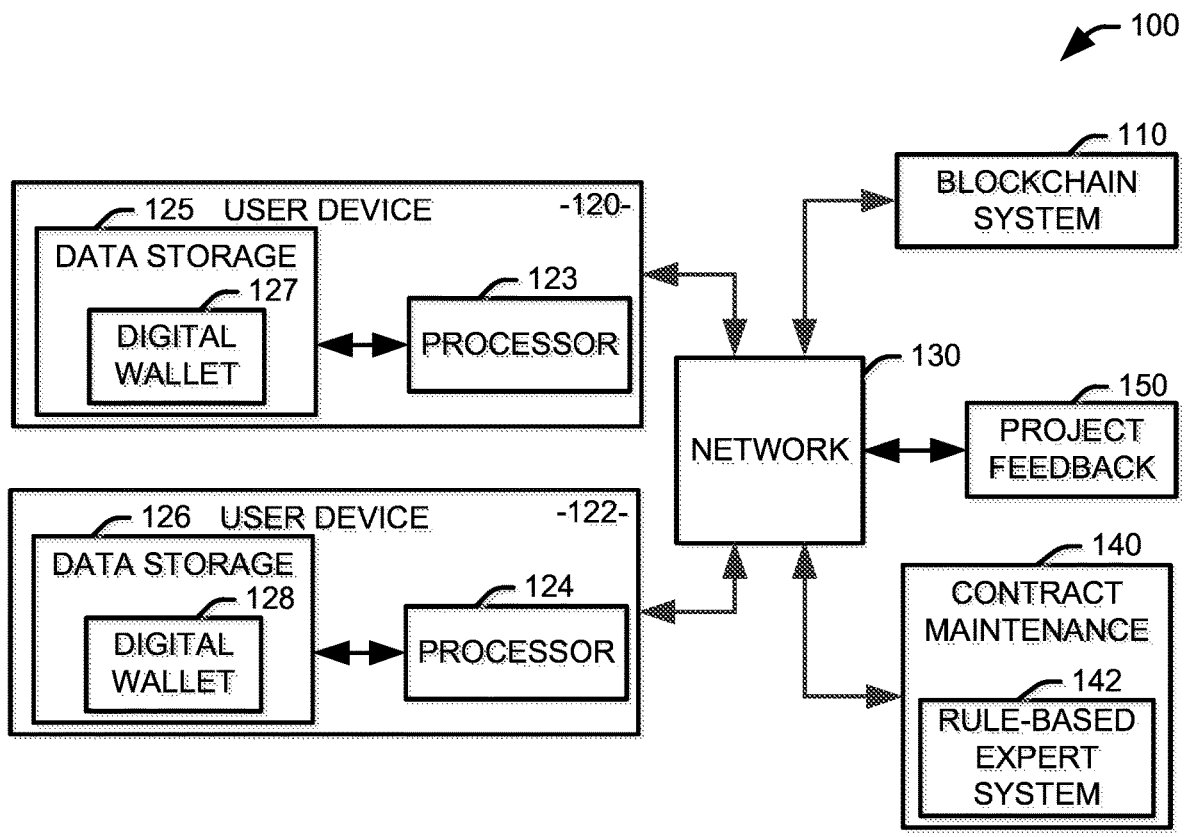
FIG. 1 shows a block diagram of a system for crowdsourcing funding of a project.

FIG. 1 shows a block diagram of a system 100 for crowdsourced funding of a project. The system 100 includes a blockchain system 110, a plurality of user computing devices 120 and 122, a contract maintenance system 140, and a project feedback system 150. Each of the contract maintenance system 140 and the feedback system 150 interact with each of the plurality of user computing devices 120 and 122 and the blockchain 110 via a network 130 (e.g., the Internet or an intranet). Each of the plurality of user computing devices includes respective hardware processors 123 and 124 operatively connected to electronic data storage 125 and 126, such as volatile or non-volatile memory. In the illustrated example, the electronic data storage 125 and 126 at each of the plurality of user computing devices 120 and 122 stores a digital wallet 127 and 128. A digital wallet 127 and 128 can be a data structure or other logical structure used to store associated data on common or dedicated electronic data storage (e.g., RAM, or a hard-drive). In certain examples, dedicated hardware devices, such as a hardware security module (HSM), may be used to store information associated with the digital wallets 127 and 128. In certain example embodiments, the digital wallet 127 and 128 may be stored on a dedicated storage hardware that is implemented externally and in communication with the system 100 (e.g., via a communication link, such as a secure connection).

Each digital wallet 127 and 128 stores blockchain wallet information for respective users. A digital wallet can be implemented as software instructions executed by a hardware processor, or specifically designed hardware, that stores information that allows an individual to make electronic commerce transactions that use, for example, a blockchain. Each digital wallet 127 and 128 can include or store a data structure that holds a private key and a series of identifiers, referred to as the wallet address, that have been generated based on the private key. These identifiers are used to allow other users to send transactions, which are recorded on the blockchain, to that identifier.

The blockchain system 110 can be distributed across a number of individual individual computer systems that are operated by different entities that maintain a single blockchain. Alternatively, the blockchain 110 can include one or more individual computer systems that are all operated by a single entity, such as the entity operating the contract maintenance system 140. The blockchain system 110 includes multiple different computer nodes that each operates to validate transactions submitted to the blockchain system. Generally, only one of the nodes needs to receive a transaction that has been submitted from a client. Once one node receives a transaction it may propagate the transaction to other nodes within the blockchain system 110.

Each transaction (or a block of transactions) is incorporated into a blockchain ledger 112 via a proof-of-work mining process. The mining process may involve solving a computationally difficult problem that is also easy to verify. For example, each node may attempt to mine a solution to the hash of a block or a transaction. Hashes include functions that map an initial input data set to an output data set, and the output from a hash function is referred to herein as a "hash value." Generally, the hash values from a given hash function have the same fixed length, and if the same hash function is used on the same input data it will result in the same output data value. With some hash functions, including those used in the context of blockchain techniques, the input value is computationally difficult to determine when only the output value is known. In certain examples, the input value for the hash function is supplemented with some additional random data, referred to as a "nonce."

In order to validate a new block into the blockchain, the hash operation process may include finding an input hash value that results in an output hash value that meets a given condition. As the data related to the blockchain transactions in the block are fixed, nodes on the blockchain modify the nonce value that is included as part of the block being validated until the output value of the hash function meets the given condition. Each node that is part of the blockchain may also keep a copy or a portion of the blockchain in memory that is local to the corresponding node.

The contract maintenance system 140 maintains information provided by registered users to maintain accurate identification for the user and ensure that transactions with the contract holder comply with any applicable regulations. It will be appreciated that the contract maintenance system 140 can be implemented on a computer system having a processor and a non-transitory memory, which can include a stand-alone server or a virtual server, implemented for example, as a cloud server. To this end, to register a digital wallet with the token contract implemented by the blockchain system 110, a user can be required to submit appropriate documents to authenticate their identity, and if relevant, their county of residence and/or citizenship. The digital wallet is then linked to the authenticated identity of the user. The identity of the user, a token balance of the user, and the country of residence or citizenship can be used at a rule-based expert system 142 that determines if the token holder can engage in a transaction with a given user.

It will be appreciated the rules governing a given transaction will vary with the application. Where the token contract is used for political fundraising, the rule-based expert system 142 may include rules determining if the person is a citizen of a particular country, a natural person, as opposed to a corporate entity, and has not contributed more than a threshold amount to the political campaign in any form. The number of tokens purchased can be determined by searching the blockchain ledger 112 for transactions between the token issuer, that is, the campaign, and the individual, and other donations by that individual can be tracked separately and provided to the rule-based expert system 142. It will be appreciated that more complex rule sets may be used to detect potential fraud, such as the use of straw donors. For example, the rule-based expert system 142 can detect individuals having aggregate token purchases at or near the threshold who later sold their tokens to one or a small group of individuals and flag them to the campaign for review. In commercial fund raising, the rule-based expert system 142 can be used to ensure that the individual lives in a country or region for which it is possible to provide any deliverables (e.g., cash dividends or a product created via the project) associated with the project without undue expense or violation of export regulations.

A project feedback system 150 a project feedback mechanism that retrieves the contents of the blockchain ledger 112 from a node of the blockchain system 110 and allows token holders to communicate with an issuer of the token contract based on the contents of the blockchain ledger. It will be appreciated that the project feedback system 150 can be implemented on a computer system having a processor and a non-transitory memory, which can include a stand-alone server or a virtual server, implemented for example, as a cloud server. The quality of feedback from Internet users generally is notorious for its poor quality, with one of the most famous examples being the attempt by the British government to allow Internet users to name a polar research vessel via an online poll. In this instance, the Natural Environment Research Council finally had to select the fifth most popular name, the RRS David Attenborough over the overwhelming winner of the poll, the RRS Boaty McBoatface. The project feedback system 150 allows for the creator of a project to receive feedback on the project only from identified individuals who are invested in the project, which is expected to avoid much of the poor quality of the feedback associated with anonymous Internet users.

In one implementation, the project feedback system 150 is implemented as a message board system, in which only token holders can access the board. In one implementation, the message board can have various levels of user privileges, and each user can be assigned a level of user privileges based on their token holdings. For example, at a minimum level of privilege, a user may only be able to upvote or downvote existing posts. Other levels may allow for comments to be made on existing topics, generation of new topics, increased posting frequency, and allowance of additional upvotes and downvotes on existing topics. For example, a user may have an "action allowance" based upon their token holdings in which various actions, such as posting new topics or upvoting or downvoting existing topics, each require expenditure of a predetermined amount of this action allowance. The action allowance can be refreshed periodically to allow for the user to continue to interact with the message board.

Alternatively, the project feedback system 150 can be implemented as an online voting system, in which the user is presented with a plurality of existing options and allowed to assign a set of one or more votes to each of the presented options. In one implementation, each user is provided with a number of votes proportional with their token holdings. Alternatively, every user holding a threshold number of tokens can have a same number of votes. Even where the number of votes provided are proportional to token holdings, the number of votes provided to a given holder can be capped at a maximum value to prevent larger investors from having undue influence overthe resulting feedback. In one implementation, these two approaches can be combined, with each token holder receiving one upvote or downvote for each option, which influence the ranking of the options presented to the project creator, but also allow token holders to "invest" tokens in a given options. When tokens are invested in the idea, a dividend of additional tokens can be issued, proportional to the number of tokens invested by the token holder, based on the success or failure of the option once implemented. The results generated at the project feedback mechanism can then be provided to a project creator for review.

It will be appreciated that the token contract can be implemented such that the "project" is the future performance of the project creator in a given field, that pays dividends to token holders based on the performance of the project creator. Accordingly, the system 100 allows for leveraging of cryptocurrencies for crowdfunding political campaigns, students, and other settings wherein individuals seek to securitize future earnings. Cryptocurrencies, such as bitcoin, have been developed as an alternative to government backed fiat currencies. Cryptocurrencies leverage blockchain technology, wherein transactions can only be validated by a multi-nodal system that is completely decentralized and trust-less. The decentralized and trust-less nature of the cryptocurrency, ironically, is ultimately what enables individual transactions to be validated as trusted without any possibility of "double spend" (e.g., hacking the currency, or otherwise compromising the integrity of the contracted transaction), allowing a system of semi-anonymous, geographically indistinct, and completely trust-less users to engage in exchanges of value in a marketplace.

The internet has enabled crowdfunding and other means to harvest capital from numerous, small contributors. Historically this has pooled capital in the form of donations, or possibly in the form of debt. For example, GoFundMe pages can be developed to raise money for causes, and LendingClub and other distributed loaning systems enable debt to be raised. Student loans are perhaps the best known source of debt financing that is secured only by the future earning potential of the individual student and their ability to payback the debt incurred. To date, students and others looking to raise capital for themselves as individuals have rarely done so by issuing equity to investors. Paver, Fantex, and other sites have done this on a limited basis, but with equivocal commercial success. Fantex issued equity in professional athletes in exchange for future earnings and revenue streams. It achieved proof of concept, but ultimately failed as a commercial product. Other celebrities such as David Bowie have issued equity stakes in their future catalog and royalty earnings in order to raise capital based on the net present value (NPV) of their future earnings. Conceptually, this is referred to as "human capital contracts" as individuals sell stock in themselves, giving quantifiable metrics to the expression "his/her stock is rising".

In one example, the human capital contract can be for the career of a politician. Political parties in the United States effectively function as the "employers" for political candidates. They utilize an arcane series of rules to procure donations of "hard money" (unlimited uses, but limited in amount) and "soft money" (somewhat limited uses, unlimited amounts). Political candidates are not able to compete freely in the election market due to the chokehold of the duopoly of Democrats and Republican parties. Independent and third party candidates have occasionally held office, but only on very rare occasions and more often than not as a result of an independently wealthy candidate "buying" the election. Independent candidates of average means must rely upon either the Democratic or Republican party as their employer to raise unlimited soft money contributions via SuperPAC and 501c4 groups. As a result, an inefficient capital market is perpetuated by design, and free market choice in political candidates is compromised.

The Federal Election Commission (FEC) theoretically oversees any abuses or infractions by such 501c4 and SuperPAC groups. However, it is split in a bipartisan fashion and as a result, fines are rarely administered and largely ineffective. Recently a $2,500 fine was handed out against a large SuperPAC with a multi-million dollar budget, and even then only after a prolonged battle within the FEC. Furthermore, the FEC openly acknowledged that a 501c4 group, which does not have to disclose its donor base, can contribute an unlimited amount to a SuperPAC under the collective name of the 501c4. As a result the "Russian doll" conundrum exists for anonymous donations from 501c4s to SuperPACs. The resulting pools of capital that are entirely opaque can influence elections in a completely legal manner without any knowledge of the source of the donations.

The US Presidency and other offices have long been viewed as assets for purchase by powerful sources of capital. Historically this included domestic industrialists such as John Rockefeller and Andrew Carnegie. With the rise of anonymous pools of opaque capital, the assets at stake in any given election have increasingly been globalized. International governments, financiers, and other influential contributors can acquire assets in an election. Often times, this results in a quid-pro quo wherein such groups have disproportionate influence over subsequent legislation. For example, AIG benefitted disproportionately from a Democratic administration, while it can be argued that the Russian government may have benefitted from the election of Donald Trump. Regardless of the specific examples, global sources of capital have an increasing degree of influence in the US election process through the duopoly of Democratic and Republican parties. As a result, the parties and their candidate employees are beholden to donor interests rather than their constituencies.

Cryptocurrencies can be harnessed to recruit capital of any amount in exchange for equity in political candidates, students, and others seeking to secure funding in exchange for future cash flows. For political applications, this de-identifies capital sources and enables candidates to act independently in a free market fashion. In return, cryptocurrency investors can be rewarded by dividends they receive based on their ownership percentage in a political candidate. This would open capital markets and participation, while also aligning the interests of investors and candidates. Dividend paybacks can accrue either through personal distributions from the candidate, or via profit-sharing arrangements with independently affiliated SuperPACs or 501c4s. In essence, this enables independent political candidates to open independent franchises based on the ideals they represent and their ability to compete in the marketplace of political ideas.

Much like websites such as Zillow compiled publicly available data to provide a tangible valuation on illiquid real estate assets, the same can be done for political candidates and offices. Similarly, for students and others, a mechanism such as eBay that creates transparent auctions with bid/ask spreads would create an efficient means for capital holders to purchase personal equity contracts. This would allow users to "shop" for individual contracts they wish to acquire, and to educate themselves on the value they can expect to achieve if they choose to invest in fractional ownership. Fractional ownership can then be achieved via cryptocurrency contributions that are executed en masse via "smart contract" blockchain technology that prevents abuse or any issues with double spend. The net result will be disruption of the static duopoly and efficient capital competition in the marketplace of political ideas.

Figure 2:
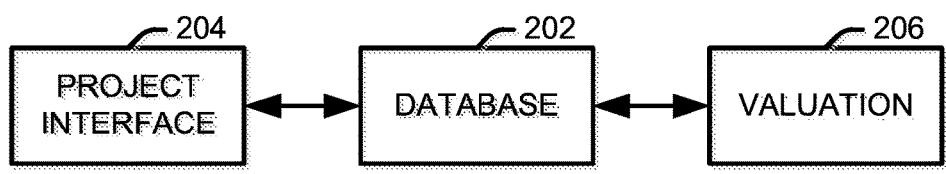
FIG. 2 illustrates a contract issuance system that can monitor each of a plurality of token contracts to allow for the issuance and maintenance of cryptocurrency-implemented human capital contracts.

To this end, FIG. 2 illustrates a contract issuance system 200 that can work in concert with the project maintenance component 140 of each of a plurality of token contracts to allow for the issuance and maintenance of cryptocurrency-implemented human capital contracts. It will be appreciated that the system 200 can be implemented on a computer system having a processor and a non-transitory memory, which can include a stand-alone server or a virtual server, implemented for example, as a cloud server. The system 200 includes a database 202 of registered users and identifiers for one or more digital wallets associated with each user. A project interface 204 allows for the ledgers of cryptocurrencies registered with the system to be accessed to automatically compile in incoming cryptocurrency coins and addresses at the database 202. In one implementation, a "blockchain of blockchains" or meta-blockchain (not shown) can be used instead of or in addition to the database to track said transactions from any cryptocurrency coin with timestamp, QR code, and transactional validation regardless of the underlying cryptocurrency.

Due to substantial market fluctuations in cryptocurrency values, at the timestamp moment of transaction incoming coins are indexed against a basket of government backed fiat currencies to assign a tangible monetary value relative to the floating market values. The basket of currencies used will be mined and indexed daily. To this end, the system 200 includes a valuation component 206 implemented using one or more machine learning algorithms to assign a spot value for each cryptocurrency at the time of a transaction. In one implemenation, the valuation component 206 uses a weighted linear combination of features taken from a basket of fiat currencies, including changes in the bid-ask spread for the cryptocurrency in each of the fiat currencies, with the weights for the weighted linear combination determined via a regression analysis on past values for the cryptocurrency. The features can also include historical values for the value of the cryptocurrency in each fiat currency, such that the resulting spot value represents a dollar-cost-averaging approach.

Utilizing an appropriate smart contract code, for example, as utilized by Ethereum, Tezos, or a comparable cryptocurrency with smart contract capabilities, the incoming coin can be assigned a fractional percentage of the equity in the individual's personal capitalization table in the databse 202 relative to prior equity transactions. Smart contract stored procedures and triggers can be used in lieu of term sheets that have been historically used to structure equity capitalization tables. Equity transactions will default to pari-passu, meaning no preferred equity or other hybrid security structures will exist, unless issuers disclose such in advance of the issuance of the smart contract. Equity in the issuer will be common equity by default, subject to the same dilution regardless of when capital was invested.

The ability to issue equity in oneself will tie a tangible asset valuation to any political candidate or office. These asset valuations are currently opaque and difficult to track. Few voters think of a candidate as an asset with a defined value, however, there are publicly available data that can be used to define the net present value of any given office or candidate. To this end, the valuation component 206 can determine a valuation for any capital contract involving a political official or candidate via an appropriate machine learning algorithm according to a set of performance metrics. Non-limiting examples of such metrics include GDP growth during an official's tenure, DOW Jones, S&P 500, and other publicly traded equity market values during an official's tenure, earmarked authorizations within an official's district, federally allocated subsidies within an official's district, deficit growth during an official's tenure, debt growth as a % of GDP during an official's tenure, tax revenue raised during an official's tenure, capital gain, dividend, and earned income tax rates during an official's tenure, and future earnings of comparable peers in the market who have left office for private contracting. For example, a value can be determined using a weighted linear combination of the performance metrics, with the weights for the weighted linear combination determined via a regression analysis on a training set of previous politicians, or for other contracts, examples of other individuals in the associated field of the token issuer.

An outgoing QR code "equity private key" is encrypted and, via a pivot table clone or other means mirrored to the incoming coin private key that corresponds to the public key on the blockchain. This functions to securitize the transaction. The transaction can be all-or-none in nature without escrow intermediaries. The equity private key is assigned as a percentage of the individual based on the "pre-money" valuation of the individual at the time of the transaction. For example, if a candidate who had raised $99 previously received $1 worth of new coin, the new investor's fractional ownership is 1% as the "post money" after the transaction. Future investors add capital through the same offering, with the final post-money value upon closure of the offering representing the "market cap" of the candidate's personal capitalization table.

This can be augmented by allowing equity holders in a candidate can trade, buy, or sell their equity private key on a secondary market in exchange for a floating market value of said equity. Secondary market sales of private keys do not influence how future dividends are distributed to shareholders. Dividend distributions back to equity holders can be based on the blockchain of prior purchases. Distributions are pro-rated based on percentage ownership from all private equity keys issued. Distributions can be delivered via cryptocurrency or government fiat currency based on preferences of the individual equity holder. Upon completion of dividend distributions that fulfill the obligations of the smart contract terms, the equity private keys are dissolved and the contract is deemed to be fulfilled.

Figure 3:
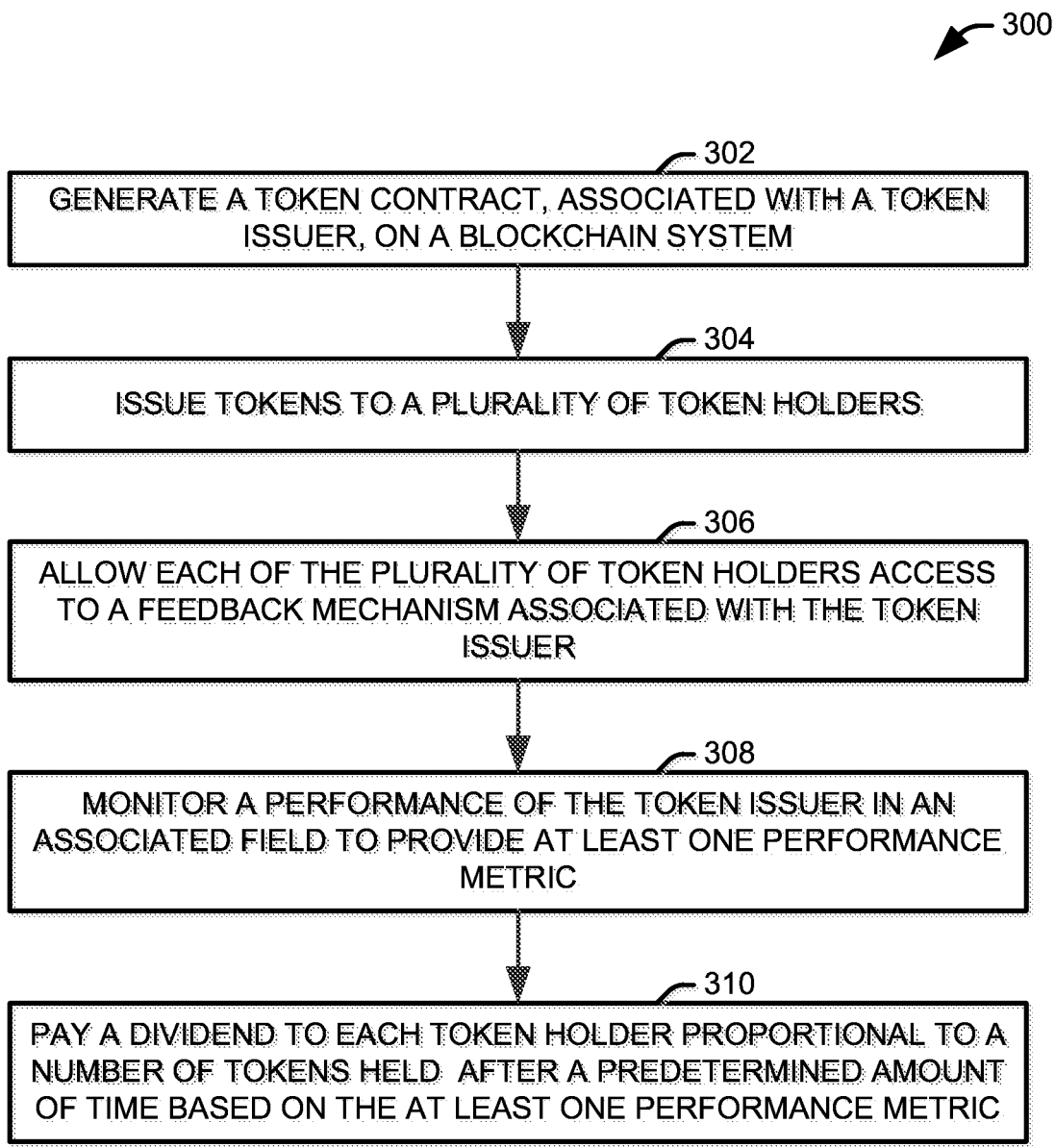
FIG. 3 illustrates a method for generating a human capital contract using cryptocurrency.
Figure 4:
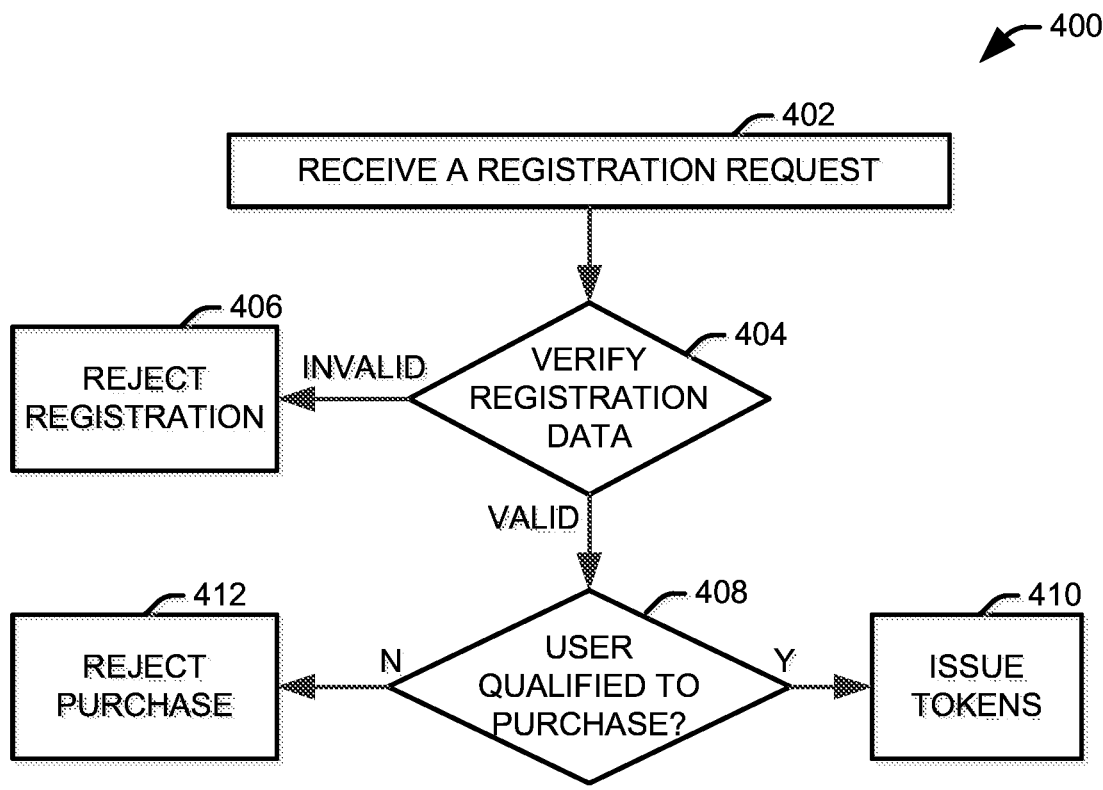
FIG. 4 illustrates a method for issuing tokens to a user.

In view of the foregoing structural and functional features described above, example methods will be better appreciated with reference to FIGS. 3 and 4. While, for purposes of simplicity of explanation, the example methods of FIGS. 3 and 4 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The methods may be implemented by the system 100 of FIG. 1 and the system 200 of FIG. 2.

FIG. 3 illustrates a method 300 for generating a human capital contract using cryptocurrency. At 302, a token contract, associated with a token issuer, is generated on a blockchain system. At 304, tokens are issued to a plurality of token holders. In one implementation, tokens are purchased by each token holder using an existing cryptocurrency. At 306, each of the plurality of token holders is given access to a feedback mechanism associated with the token issuer. The feedback mechanism can include, for example, a message board or voting system that allows a token holder access based on the token holdings of the token holder. In one example, a set of user privileges or a number of votes is determined for each token holder according to a number of tokens held by the token holder.

At 308, a performance of the token issuer in an associated field is monitored to provide at least one performance metric. In one implementation, in which the token issuer is a political candidate, the at least one performance metric can include one or more of gross domestic product (GDP) growth during a tenure of the candidate, publicly traded equity market values during the tenure of the candidate, earmarked authorizations within a district of the candidate, federally allocated subsidies within the district of the candidate, deficit growth during the tenure of the candidate, a ratio of debt growth to GDP during the tenure of the candidate, tax revenue raised durign the tenure of the candidate, aggregate reported capital gains during the tenure of the candidate, aggregate reported dividends issued during the tenure of the candidate, aggregate reported earned income tax rates during the tenure of the candidate, and future earnings of comparable peers of the candidate in the market who have left office for private contracting.

At 310, a dividend is paid to each token holder proportional to a number of tokens held by the token holder after a predetermined amount of time based on the at least one performance metric. This can be at an expiration of the contract or simply performed periodically during the time the contract is held. In one implementation, the dividend is determined using a weighted linear combination of a plurality of performance metrics, with the weights for the weighted linear combination determined via a regression analysis on a training set of previous examples in the associated field of the token issuer. In one implementation, a database of registered users associated with the token contract and identifiers for one or more digital wallets associated with each user is maintained, and a project interface that monitors a ledger associated with the token contract and updates the database to represent a balance for each user in the ledger. A valuation component can assign a spot value for issued tokens at a time of a transaction based on a basket of fiat currencies to allow for transactions of the issued tokens using other forms of cryptocurrency.

FIG. 4 illustrates a method 400 for issuing tokens to a user. At 402, a registration request is received from a user at a contract maintenance system. Registration data can include one or more of a full legal name of an individual, an e-mail address, a phone number, a mailing address, country of citizenship, and a social security number. For verification purposes, the registration request may also include a copy of a government issued ID as well as a proof of residency, such as a recent utility bill. At 404, the registration information is verified. It will be appreciated that the degree of verification necessary for the registration may vary with the application. For most applications, the registration information may be accepted with little or no verification, for example, checking to see if the address given is a valid address. For more sensitive applications, verification services may be used to ensure that the customer actually resides or does business at the address given. If the registration information is found to be invalid (INVALID), the registration is rejected at 406.

If the registration is found to be valid (VALID), it is determined if the user is qualified to purchase tokens from the contract issuer at 408. In one implementation, it can be determined if the user is a citizen of a specific country associated with the token contract and has not purchased more than a threshold dollar amount of the tokens from the issuer within a defined window of time. For other implementations, the token issuer may set different requirements. If the user is qualified to purchase tokens from the issuer (Y), the tokens are issued at 410. Otherwise (N), the purchase is rejected at 412.

Figure 5:
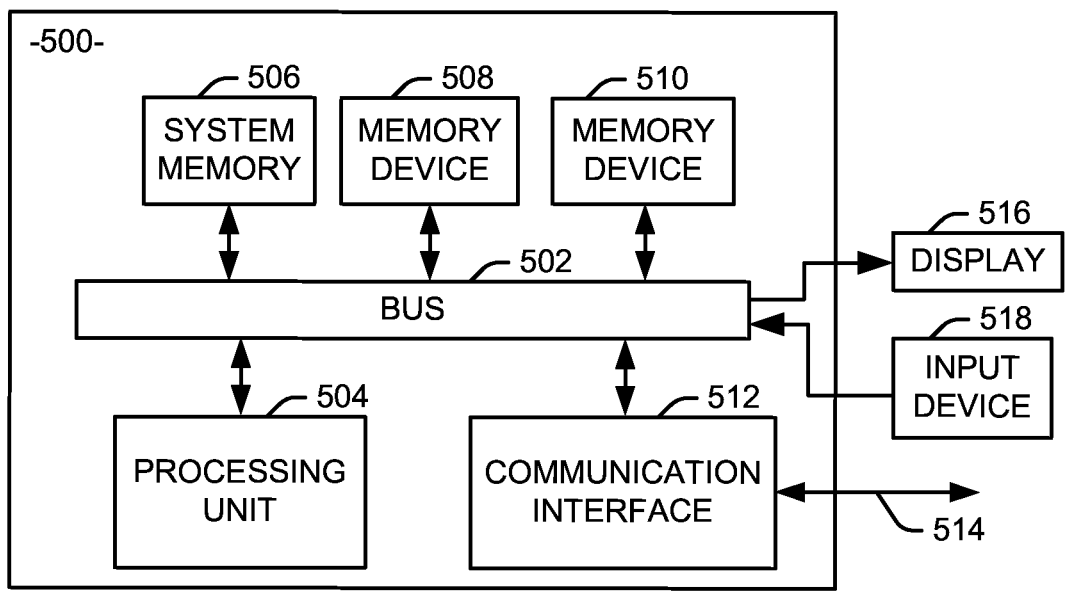
FIG. 5 illustrates a computer system that can be employed to implement examples of the systems and methods disclosed in FIGS. 1-4.

FIG. 5 illustrates an example computer system 500 that can be employed to implement examples of the systems and methods disclosed in FIGS. 1-4. The computer system 500 can be implemented on one or more general purpose networked computer systems, embedded computer systems, routers, switches, server devices, client devices, various intermediate devices/nodes and/or stand alone computer systems. It will be appreciated that, given the distributed nature of the blockchain system 110, the illustrated computer system 500 can be one of a plurality of computer systems that execute nodes of the blockchain system. Alternatively, the illustrated computer system can represent a user device storing a digital wallet or the contract maintenance system 140 for a securitized token trading system.

The system 500 can includes a system bus 502, a processing unit 504, a system memory 506, memory devices 508 and 510, a communication interface 512 (e.g., a network interface), a communication link 514, a display 516 (e.g., a video screen), and an input device 518 (e.g., a keyboard and/or a mouse). The system bus 502 can be in communication with the processing unit 504 and the system memory 506. The additional memory devices 508 and 510, such as a hard disk drive, server, stand-alone database, or other non-volatile memory, can also be in communication with the system bus 502. The system bus 502 interconnects the processing unit 504, the memory devices 506-510, the communication interface 512, the display 516, and the input device 518. In some examples, the system bus 502 also interconnects an additional port (not shown), such as a universal serial bus (USB) port.

The processing unit 504 can be a computing device and can include an application-specific integrated circuit (ASIC). The processing unit 504 executes a set of instructions to implement the operations of examples disclosed herein. The processing unit can include a processing core.

The additional memory devices 506, 508, and 510 can store data, programs, instructions, database queries in text or compiled form, and any other information that can be needed to operate a computer. The memories 506, 508 and 510 can be implemented as computer-readable media (integrated or removable) such as a memory card, disk drive, compact disk (CD), or server accessible over a network. In certain examples, the memories 506, 508 and 510 can comprise text, images, video, and/or audio, portions of which can be available in formats comprehensible to human beings. Additionally or alternatively, the system 500 can access an external data source or query source through the communication interface 512, which can communicate with the system bus 502 and the communication link 514.

In operation, the system 500 can be used to implement one or more parts of a system for trading securitized tokens in accordance with the present invention. Computer executable logic for implementing various components of the system reside on one or more of the system memory 506, and the memory devices 508, 510 in accordance with certain examples. The processing unit 504 executes one or more computer executable instructions originating from the system memory 506 and the memory devices 508 and 510. The term "computer readable medium" as used herein refers to any medium that participates in providing instructions to the processing unit 504 for execution, and it will be appreciated that a computer readable medium can include multiple computer readable media each operatively connected to the processing unit.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing that contain or carry instruction(s) and/or data.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method comprising:
   generating a token contract, associated with an individual, on a blockchain system, the token contract having a set of terms obligating payment of dividends to each of a plurality of token holders who have been issued a token of a plurality of tokens associated with the token contract;
   issuing tokens associated with the token contract to the plurality of token holders, each of the plurality of token holders being provided with one of a plurality of encrypted quick response (QR) codes, each representing a private key corresponding to a public key recorded on the blockchain associated with a token of the plurality of tokens;
   providing personal information associated with a purchaser to a rule-based expert system, the rule-based expert system determining if a token holder of the plurality of token holders can engage in a transaction with the purchaser based upon the personal information;
   registering a digital wallet associated with the purchaser with the token contract if it is determined that the token holder can engage in the transaction with the purchaser;
   recording a transfer of one of the plurality of tokens from the token holder to the purchaser as a transaction on the blockchain;
   monitoring a performance of the individual in an associated field to provide at least one performance metric;
   paying a dividend to each token holder proportional to a number of tokens held by the token holder after a predetermined amount of time, the dividend being based on the at least one performance metric; and
   dissolving the plurality of encrypted QR codes upon satisfaction of the set of terms for the token contract through payment of dividends.

2. The method of claim 1, wherein the individual is a political candidate, and the at least one performance metric includes at least one of gross domestic product (GDP) growth during a tenure of the candidate, publicly traded equity market values during the tenure of the candidate, earmarked authorizations within a district of the candidate, federally allocated subsidies within the district of the candidate, deficit growth during the tenure of the candidate, a ratio of debt growth to GDP during the tenure of the candidate, tax revenue raised during the tenure of the candidate, aggregate reported capital gains during the tenure of the candidate, aggregate reported dividends issued during the tenure of the candidate, aggregate reported earned income tax rates during the tenure of the candidate, and future earnings of comparable peers of the candidate in the market who have left office for private contracting.

3. The method of claim 1, wherein the at least one performance metric includes a plurality of performance metrics, and the dividend is determined using a weighted linear combination of the performance metrics, with the weights for the weighted linear combination determined via a regression analysis on a training set of previous examples in the associated field of the token issuer.

4. The method of claim 1, wherein issuing tokens to a plurality of token holders comprises providing tokens to each token holder in exchange for an existing cryptocurrency.

5. The method of claim 1, further comprising:
   maintaining a database of registered users associated with the token contract and identifiers for one or more digital wallets associated with each user;
   a project interface that monitors a ledger associated with the token contract and updates the database to represent a balance for each user in the ledger; and
   a valuation component that assigns a spot value for issued tokens at a time of a transaction.

6. The method of claim 1, further comprising allowing each of the plurality of token holders access to a feedback mechanism associated with the individual.

* * * * *